(12) United States Patent
Tanjou

(10) Patent No.: US 7,609,034 B2
(45) Date of Patent: Oct. 27, 2009

(54) BATTERY PACK, METHOD OF MANUFACTURING BATTERY PACK, AND METHOD OF CONTROLLING BATTERY PACK

(75) Inventor: Yuuji Tanjou, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 138 days.

(21) Appl. No.: 11/683,261

(22) Filed: Mar. 7, 2007

(65) Prior Publication Data

US 2007/0210746 A1 Sep. 13, 2007

(30) Foreign Application Priority Data

Mar. 8, 2006 (JP) .............................. 2006-062690

(51) Int. Cl.
*H02J 7/04* (2006.01)
*H02J 7/16* (2006.01)

(52) U.S. Cl. .................. 320/150; 320/116; 320/119; 320/121

(58) Field of Classification Search ......... 320/116–122, 320/150
See application file for complete search history.

(56) References Cited

U.S. PATENT DOCUMENTS 5,652,500 A * 7/1997 Kadouchi et al. ............ 320/150
5,889,385 A * 3/1999 Podrazhansky et al. ..... 320/130
6,583,602 B2 * 6/2003 Imai et al. .................... 320/118
2003/0198866 A1 * 10/2003 Tanjou et al. ................ 429/149

FOREIGN PATENT DOCUMENTS

JP 2003-346748 12/2003

* cited by examiner

*Primary Examiner*—Edward Tso
*Assistant Examiner*—Samuel Berhanu
(74) *Attorney, Agent, or Firm*—Young Basile

(57) ABSTRACT

A battery pack having a plurality of electrically connected unit cells and configured so that the cells degrade at similar rates is provided. The battery pack may comprise a first unit cell and a second unit cell, wherein a temperature of the second unit cell is lower than the first unit cell. A condition of the first cell, such as states of charge or an open circuit voltage is set so that the condition of the first unit cell is less than a corresponding condition of the second unit cell. The unit cells may be thin battery cells stacked in a thickness direction of the thin battery cells, and the first unit cell may be located on an inner side of the second unit cell as viewed in a stacked direction. A temperature detecting unit may detect a temperature of each of the first and second unit cells and a charge control unit may be configured to control charging of the plurality of unit cells according to the temperatures of the first and second unit cells. With this configuration, even when the temperatures of the unit cells are not uniform, the rates of deterioration of the unit cells are equalized as much as possible.

7 Claims, 4 Drawing Sheets

BATTERY PACK, METHOD OF MANUFACTURING BATTERY PACK, AND METHOD OF CONTROLLING BATTERY PACK

CROSS-REFERENCE TO RELATED APPLICATIONS

This application claims priority under 35 U.S.C. § 119 to Japanese Patent Application No. 2006-062690 filed on Mar. 8, 2006. The entire disclosure of Japanese Patent Application No. 2006-062690 is hereby incorporated herein by reference.

BACKGROUND OF THE INVENTION

1. Field of the Invention

The present invention relates to a battery pack having a plurality of unit cells electrically interconnected, a method of manufacturing the battery pack and a method of controlling the battery pack.

2. Description of the Related Art

A battery pack having a structure in which a plurality of thin battery cells (unit cells) are stacked together and interconnected has been known as disclosed in Japanese Patent Application Laid-Open No. 2003-346748 (Patent Document 1).

The battery pack described in the Patent Document 1 is structured such that a plurality of thin battery cells stacked together is contained in a box. The thin battery cells in the box are controlled so as to have uniform values of voltage.

When a specific thin battery cell among the plurality deteriorates to a greater degree than the other thin battery cells, the deteriorated thin battery cell must be replaced with a new one. To replace such a specific deteriorated thin battery cell, substantial effort is required to take the battery pack from the box and to disassemble it. Also, it is not economical to replace the whole battery pack when only one of the plurality of thin battery cells has deteriorated. For this reason, it is desirable to use thin battery cells that deteriorate at similar rates.

SUMMARY OF THE INVENTION

The present invention has been proposed in light of the above-described circumstances. An object of the invention is to provide a battery pack having a plurality of battery cells that deteriorate at similar rates, a method of manufacturing the battery pack, and a method of controlling the battery pack.

According to one aspect of the present invention, a battery pack having a plurality of electrically connected unit cells is provided. The battery pack may comprise a first unit cell and a second unit cell, wherein a temperature of the second unit cell is lower than the first unit cell. A condition of the first cell, such as states of charge or an open circuit voltage is set so that the condition of the first unit cell is less than a corresponding condition of the second unit cell. The unit cells may be thin battery cells stacked in a thickness direction of the thin battery cells, and the first unit cell may be located on an inner side of the second unit cell as viewed in a stacked direction. A temperature detecting unit may detect a temperature of each of the first and second unit cells, and a charge control unit may be configured to control charging of the plurality of unit cells according to the temperatures of the first and second unit cells detected by the temperature detecting unit such that a condition such as states of charge or open circuit voltage of the first unit cell is less than a corresponding condition of the second unit cell having temperatures lower than those of the first unit cell.

According to another aspect of the present invention, a method of manufacturing a battery pack containing a plurality of flat battery cells stacked together and electrically connected is provided, comprising: charging a first flat battery cell to a condition such as a state of charge or an open-circuit voltage; charging a second flat battery cell located on the outer side of the first flat battery cell to a corresponding condition which is higher than the first condition; and laminating and electrically connecting in series the first and second flat battery cells.

According to still another aspect of the present invention, a method of controlling a battery pack containing a plurality of electrically connected unit cells is provided, comprising: detecting a temperature of each of the unit cells; and controlling a condition such as states of charge of the unit cells or open circuit voltages of the unit cells according to the detected temperatures of the unit cells. States of charge (SOC) or open-circuit voltages of first unit cells are set to be lower than states of charge (SOC) or open-circuit voltages of second unit cells. The second unit cells have temperatures lower than those of the first unit cells.

In one example, a battery pack according to the invention comprises a plurality of unit cells electrically interconnected. The states of charge (SOC) or open-circuit voltages of a first unit cell are set to be lower than states of charge (SOC) or open-circuit voltages of a second unit cell. The second unit cell(s) have temperatures lower than those of the first unit cell(s). With this configuration, the rates of deterioration of a plurality of thin battery cells can be equalized as much as possible.

DESCRIPTION OF THE PREFERRED EMBODIMENTS

Embodiments of the invention will be described with reference to the accompanying drawings.

In one example, a battery pack 10 may be used as a power source for energizing auxiliary devices of automobiles, such as a starter motor and headlamps. The battery pack 10 is located in, for example, an engine compartment or a luggage compartment (trunk) of a vehicle, and is used in a temperature range from normal temperature (atmospheric temperature) to about 60° C.

Figure 1A:
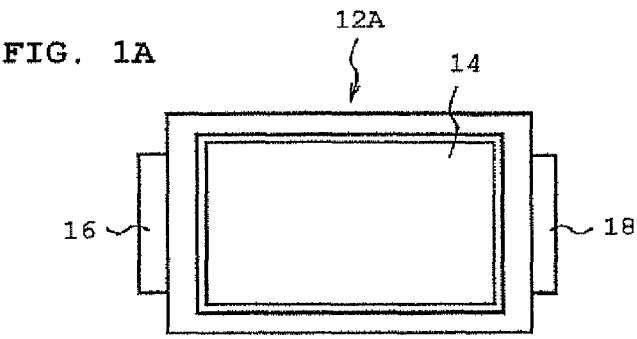
FIG. 1A is a top view showing a configuration of a battery pack to be controlled according to embodiments of the present invention.
Figure 1B:
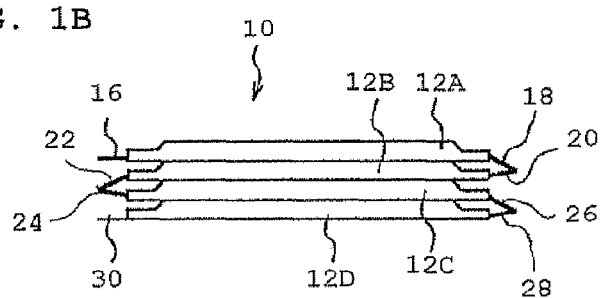
FIG. 1B is a side view showing a configuration of a battery pack to be controlled according to embodiments of the present invention.
Figure 1C:
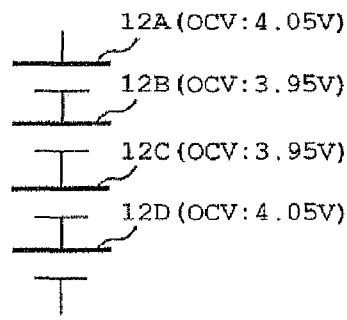
FIG. 1C is a circuit diagram showing a configuration of a battery pack to be controlled according to embodiments of the present invention.

The battery pack 10 has four thin battery cells 12A, 12B, 12C, 12D (unit cells) connected in series as shown in FIGS. 1B and 1C. Each of the thin battery cells 12A, 12B, 12C, 12D is a lithium ion battery producing a voltage of about 4.2 V in the full state-of-charge. Accordingly, the battery pack 10 produces a voltage of about 16.8 V in the full state-of-charge.

FIG. 1A is a top view showing the thin battery cell 12A of the battery pack 10. A lamination of a positive electrode plate and a negative electrode plate is placed in an enclosing body 14, which is formed by shaping a covering film (such a lamination film) like a bag. Battery terminals 16, 18, which are connected to the cell component, extend outside the enclosing body 14. It is assumed that the remaining thin battery cells 12B, 12C, 12D that form the battery pack 10 have the same construction as the thin battery cell 12A.

As shown in the side view of FIG. 1B, the battery pack 10 is constructed such that the four sheets of thin battery cells 12A, 12B, 12C, 12D are stacked, and the thin battery cells 12A and 12D (second unit cells) are located in the outermost position as viewed from the side (cross-section view in the figure) while the thin battery cells 12B and 12C (first unit cells) are located in the innermost position as viewed in the same direction.

The battery terminals 16, 18, 20, 22, 24, 26, 28, 30 of the thin battery cells 12A, 12B, 12C, 12D are connected so as to form an electrical series connection of the thin battery cells 12A, 12B, 12C, 12D as shown in FIG. 1C. The battery terminals 16, 30 of the thin battery cells 12A and 12D are connected to an electrical apparatus (not shown) and supply electric power to the apparatus.

When the battery pack 10 thus constructed supplies electric power to the electric apparatus, the thin battery cells 12A, 12B, 12C, 12D of the battery pack 10 discharge and supply the electric power. If equivalent currents flow through the stacked thin battery cells 12A, 12B, 12C, 12D, the amount of heat generated by those battery cells are substantially equal to one another. In this case, temperature of the thin battery cells 12B and 12C, which are located on the inner side, among the thin battery cells 12A, 12B, 12C, 12D forming the battery pack, is higher than that of the thin battery cells 12A and 12D on the outer sides.

Figure 2:
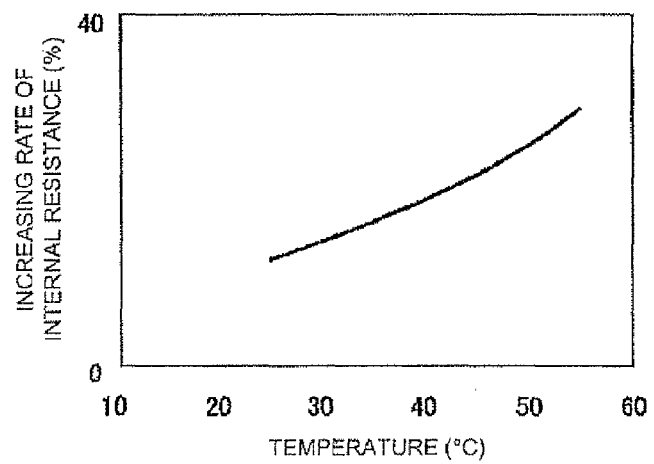
FIG. 2 is a graph showing a relationship of an increasing rate of internal-resistance of a thin battery cell with respect to temperature.

FIG. 2 represents a variation of an increasing rate of internal-resistance with respect to the temperature at which the thin battery cell is stored when the thin battery cells were stored for about six months with a state of charge (SOC) of 50%. As seen from FIG. 2, as the temperature rises, the increasing rate of internal-resistance (%) (i.e., battery deterioration rate) increases.

Figure 3:
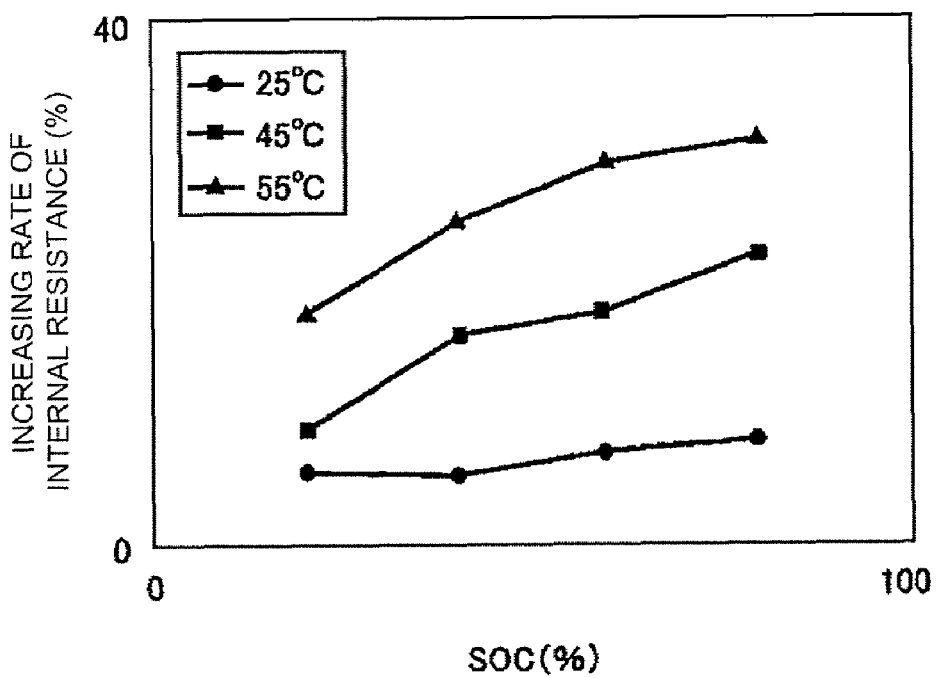
FIG. 3 is a graph showing relationships between a state of charge (SOC) of a thin battery cell and an increasing rate of internal-resistance of the same.

FIG. 3 represents a variation of the increasing rate of internal-resistance with respect to a state of charge of a thin battery cell 12A, 12B, 12C, 12D when it is stored. The thin battery cell was stored for about six months at different temperatures (25.degree. C., 45.degree. C. and 55. degree. C.). As seen from FIG. 3, as the SOC (%) of the thin battery cell 12A, 12B, 12C, 12D increases, the increasing rate of internal-resistance (%) (i.e., battery deterioration rate) increases.

The term "state of charge (SOC)" generally means a rate of remaining electric energy (remaining capacity) to a storage electric energy (capacitance) when the battery is fully charged, and in the specification, it will be referred to as a state of charge or SOC. The term "increasing rate of internal-resistance" means a rate of change of the internal resistance of the current battery to that of a new battery, and it is expressed in terms of %.

Thin battery cells 12A and 12D are located on the outer sides of the battery pack 10, and therefore the heat generated at the time of charging and discharging easily dissipates. The SOC of the thin battery cells 12A and 12D is selected to be higher than that of the thin battery cells 12B and 12C. Thin battery cells 12B and 12C are located on the inner sides of the thin battery cells 12A and 12D and therefore heat generated at the time of the charging/discharging hardly dissipates. Thereby, a variation of the rates of deterioration (increasing rate of internal-resistance) of the thin battery cells 12A, 12B, 12C, 12D forming the battery pack can be minimized. It is known that a correlation is present between the SOC of the thin battery and an open-circuit voltage. Namely, as the SOC increases, the open-circuit circuit voltage increases. Therefore, as shown in FIG. 1C, the open-circuit voltages of the thin battery cells 12B and 12C (of which temperature rises highest at the time of charging/discharging) may be set to be lower than those of the thin battery cells 12A and 12D (of which temperature does not rise as high above the temperature of the thin battery cells 12B and 12C at the time of charging/discharging).

The term "open-circuit voltage" generally means a voltage between the terminals of the battery (electromotive voltage of the battery itself) at no load, and it is also called "open voltage" or "no-load voltage".

In other words, the states of charge of the thin battery cells 12B and 12C (of which temperature rises highest at the time of charging/discharging) are set to be lower than those of the thin battery cells 12A and 12D (of which temperature does not rise as high above the temperature of the thin battery cells 12B and 12C at the time of charging/discharging). Alternatively, the open-circuit voltage of the thin battery cells 12A and 12D (of which the temperature does not rise as high at the time of charging/discharging) is set to be higher than that of the thin battery cells 12B and 12C (of which temperature rises highest above the temperature of the thin battery cells 12A and 12D at the time of charging/discharging).

The internal-resistance rate, as stated above, is a rate (%) of change of the internal resistance of a battery after it has deteriorated from the internal resistance of a new battery when the internal resistance of the new battery is set at 1. The increasing rate of internal-resistance is mathematically expressed by:

$$((R_1 - R_o)/R_o) \times 100$$

where $R_o$ denotes the internal resistance of a new battery; and $R_1$ denotes the internal resistance of the battery after it is deteriorated.

In the example shown in FIG. 1C, an average open-circuit voltage of the thin battery cells 12A, 12B, 12C and 12D is set at 4 V. The open-circuit voltages of the thin battery cells 12B and 12C is set at 3.95 V. The temperature of these cells rises highest at the time of charging/discharging (higher than the temperature of the thin battery cells 12A and 12D at the time of charging/discharging). The open-circuit voltage of the thin battery cells 12A and 12D is set at 4.05 V. The temperature of these cells does not rise as high at the time of charging/discharging (lower than the temperature of the thin battery cells 12B and 12C at the time of charging/discharging).

The following option is also possible. The average states of charge of the thin battery cells 12A, 12B, 12C and 12D are set at 80%; the states of charge of the thin battery cells 12B and 12C (of which temperature rises highest at the time of charging/discharging) are each set at 75%; and the states of charge of the thin battery cells 12A and 12D (of which temperature does not rise as high at the time of charging/discharging) are each set at 85%. It is known that a correlation is generally present between the open-circuit voltage and the SOC. As the state of charge of the thin battery cells 12A, 12B, 12C, 12D is increased, the open-circuit voltage becomes high. Conversely, as the open-circuit voltage is increased, the state of charge of the thin battery cells 12A, 12B, 12C, 12D becomes high. In the example mentioned above, the open-circuit voltage is 4.05 V when the state of charge of the thin battery cells 12A, 12B, 12C, 12D is 85%, and the open-circuit voltage is 3.95 V when the state of charge is 75%.

Figure 4:
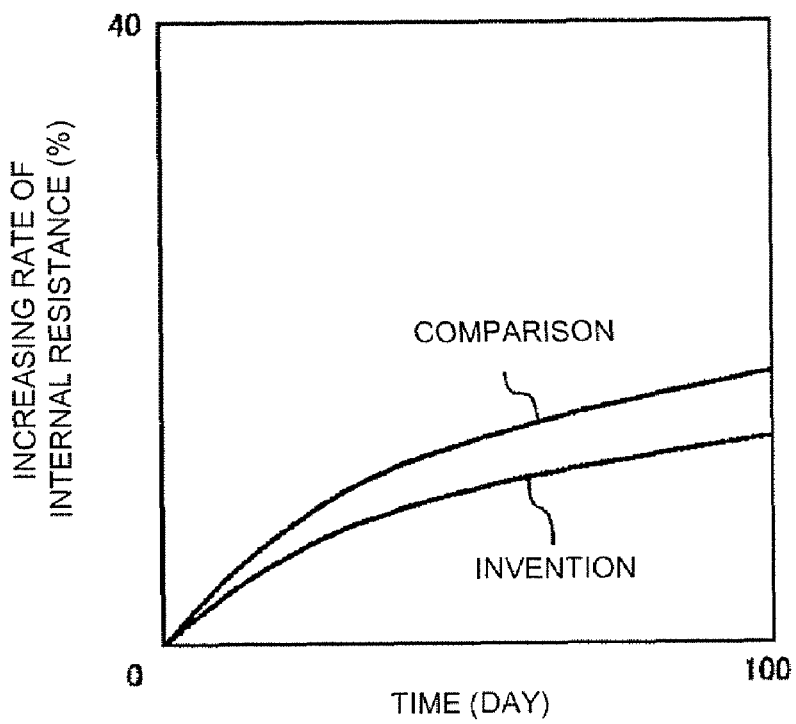
FIG. 4 is a graph showing variations of the increasing rate of internal-resistance of a battery pack and a comparison with respect to time of use.

A relationship between the increasing rate of internal-resistance (%) of the battery pack 10 and the time-of-use (day) is shown in FIG. 4. This relationship occurs in two cases. The first case is when the open-circuit voltages or the states of charge of the thin battery cells 12B and 12C (of which temperature rises highest at the time of charging/discharging) are lower than the thin battery cells 12A and 12D (of which temperature does not rise as high) (one embodiment of the present invention). The other case is when the open-circuit voltages or the states of charge of a plurality of thin batteries 12A, 12B, 12C, 12D are equal to one another (comparison). Current in battery pack 10 was kept constant while measuring the variation of increasing rate of internal-resistance shown in FIG. 4. The currents of the thin battery cells 12A, 12B, 12C, 12D were kept constant at the time of charging/discharging by repeating a sequence of four steps of (1) charging, (2) charging/discharging rest, (3) discharging, and (4) charging/discharging rest.

For the discharge conditions, the current value is 10 CA (able to completely discharge the fully charged battery at a fixed current for six minutes), and the discharge end voltage (voltage at the end of discharge) is 2.5 V. For the charge conditions, the current value is 10 CA (equal to the current value at the time of discharging), and the charge end voltage (voltage at the end of charging) is 4.2 V. The charging/discharging rest is one minute. The internal resistance was measured in a manner that voltage dropped when the thin battery cells 12A, 12B, 12C, 12D were discharged at a fixed current, and a DC resistance value was calculated by applying the current value and the voltage value to Ohm's law.

As seen from FIG. 4, the increasing rate of internal-resistance (%) of the battery pack 10 of the one embodiment of the present invention more gently varies than that of a battery pack (comparison) in which the states of charge (open-circuit voltages) of all the thin battery cells 12A, 12B, 12C, 12D are equal to one another.

The reason why a difference occurs among the increasing rate of internal-resistance of the battery packs will be described. The temperature of each thin battery cell 12A, 12B, 12C, 12D rises when the battery pack 10 is charged and discharged. The heat dissipation from the thin battery cells 12A and 12D that are located on the outer side as viewed in the stacking direction (hereinafter referred to as the outer side thin battery cells 12A and 12D) is higher than that of the thin battery cells 12B and 12C that are located on the inner sides as viewed in the stacking direction (hereinafter referred to as the inner side thin battery cells 12B and 12C). Accordingly, the temperature of the inner side thin battery cells 12B and 12C is higher than that of the outer side thin battery cells 12A and 12D. Particularly, when the states of charge or the open-circuit voltages of the battery cells 12A, 12B, 12C, 12D are equal as in the case of the comparison, the internal resistance of the inner side thin battery cells 12B and 12C is higher than that of the outer side thin battery cells 12A and 12D. Accordingly, in the case of the battery pack of the comparison, the service life of the inner side thin battery cells 12B and 12C determines that of the battery pack per se.

In a case where the states of charge or the open-circuit voltages of the inner side thin battery cells 12B and 12C are lower than the states of charge or the open-circuit voltages of the outer side thin battery cells 12A and 12D, as in the case of the present application, a difference between the increasing rate of internal-resistance of the outer side thin battery cells 12A and 12D and that of the inner side thin battery cells 12B and 12C is reduced. This results in the service life of the battery pack of the invention being longer than that of the comparison.

In the embodiment, the states of charge or the open-circuit voltages of the inner side thin battery cells 12B and 12C are lower than the states of charge or the open-circuit voltages of the outer side thin battery cells 12A and 12D. Accordingly, the service life of the inner side thin battery cells 12B and 12C is close to that of the outer side thin battery cells 12A and 12D. In the example mentioned above, when the difference between the states of charge of the thin battery cells 12B and 12C and the states of charge of the outer side thin battery cells 12A and 12D is limited to be within 10% of the maximum capacity of each thin battery cell 12A, 12B, 12C, 12D, the service life of the outer side thin battery cells 12A and 12D is substantially equal to that of the inner side thin battery cells 12B and 12C. Also, when the difference between the open-circuit voltages of the thin battery cells 12B and 12C and the open-circuit voltages of the outer side thin battery cells 12A and 12D is limited to be within 0.1 V, the service life of the outer side thin battery cells 12A and 12D is substantially equal to that of the inner side thin battery cells 12B and 12C.

The difference between the states of charge or the open-circuit voltages of the thin battery cells 12B and 12C and the states of charge or the open-circuit voltages of the thin battery cells 12A and 12D is much larger than the difference between the states of charge or the open-circuit voltages as mentioned above. In this case, the increasing rate of internal-resistance (caused by the difference between the states of charge of the inner side thin battery cells 12B and 12C and the outer side thin battery cells 12A and 12D) or the open-circuit voltage difference, is larger than the increasing rate of internal-resistance caused by the temperature difference between the inner side thin battery cells 12B and 12C and the outer side thin battery cells 12A and 12D. Further, the increasing rate of internal-resistance of the outer side thin battery cells 12A and 12D exceeds that of the inner side thin battery cells 12B and 12C. For this reason, it is preferable that the difference between the states of charge of the thin battery cells 12B and 12C (i.e., the lowest states of charge of the thin batteries) and the states of charge of the outer side thin battery cells 12A and 12D (i.e., the highest states of charge of the thin batteries) is limited to be within 10% of the maximum capacity of each thin battery cell 12A, 12B, 12C, 12D. Alternatively, it is preferable that the difference between the open-circuit voltages of the thin battery cells 12B and 12C (i.e., the lowest open-circuit voltages of the thin batteries) and the open-circuit voltages of the outer side thin battery cells 12A and 12D (i.e., the highest open-circuit voltages of the thin batteries) is limited to be within 0.1 V.

In another embodiment of the present invention, a control unit is used to regulate discharge of the cells 12A, 12B, 12C, 12D. In the battery pack 10 with the thin battery cells 12A, 12B, 12C, 12D electrically connected in series, the currents flowing through the cells 12A, 12B, 12C, 12D at the time of charging/discharging are substantially equal to one another. Before those thin battery cells are connected in series to form a battery pack, those batteries may be programmed so as to have different states of charge (open-circuit voltage difference). The batteries thus programmed, when connected in series, are charged and discharged while keeping the state-of-charge difference (open-circuit voltage difference). Specifically, assume a case where the battery pack, which includes a plurality of electrically series-connected thin batteries stacked together, is installed in a luggage compartment (trunk) and is free from influence by outside temperature. In this case, the battery is charged such that the states of charge (SOC) or the open-circuit voltages of the inner side thin battery cells 12B and 12C (first battery cells) are higher than those of the outer side thin battery cells 12A and 12D (second battery cells). Following this, those thin battery cells are stacked and electrically connected in series to form a battery pack, whereby the service lives of the thin battery cells are uniformized as much as possible.

Figure 5:
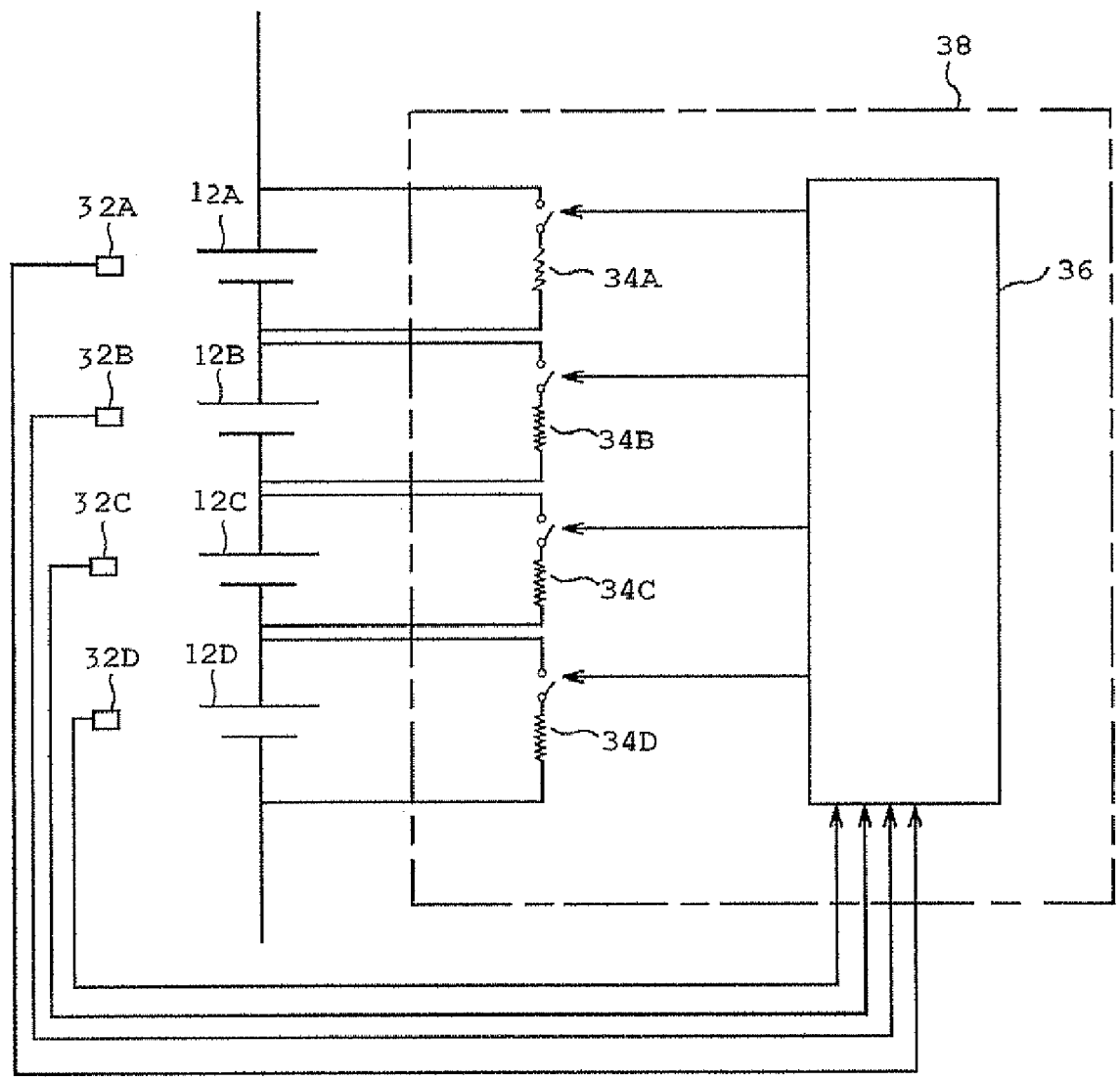
FIG. 5 is a block diagram showing a configuration for controlling voltages of thin battery cells according to detected temperatures of the cells.

In a case where the battery pack is installed in an engine compartment of a vehicle, for example, the battery pack is thermally affected by the engine. As a result, temperatures of the inner side thin battery cells do not always increase the most at the time of charging/discharging of the battery pack. To avoid this, it is preferable that the temperatures of the batteries are detected. The states of charge (SOC) or the open-circuit voltages of the batteries are then controlled according to the detected temperatures. The embodiment is arranged as shown in FIG. 5. Temperatures of the thin battery cells 12A, 12B, 12C and 12D are detected by temperature detecting units (temperature control means) 32A, 32B, 32C and 32D, and the states of charge or the open-circuit voltages of the thin battery cells 12A, 12B, 12C and 12D are controlled by a state-of-charge (SOC) control unit 38. The state-of-charge (SOC) control unit 38 consists of a controller 36 and discharging circuits 34A, 34B, 34C and 34D.

The temperature detecting units 32A, 32B, 32C and 32D are thermal sensors for detecting and outputting temperatures of the thin battery cells 12A, 12B, 12C and 12D. The outputs from the temperature detecting units 32A, 32B, 32C and 32D are output to the controller 36 of the SOC control unit 38.

The SOC control unit 38 contains the controller 36 and discharging circuits 34A, 34B, 34C and 34D.

The discharging circuits 34A, 34B, 34C and 34D are each a series circuit of a switch and a resistor, and those series circuits are connected across the thin battery cells 12A, 12B, 12C and 12D, respectively. In the discharging circuits 34A, 34B, 34C and 34D, the switches are turned on according to commands from the controller 36 to consume the electric power from the thin battery cells 12A, 12B, 12C and 12D to control the SOCs of the thin battery cells 12A, 12B, 12C and 12D, respectively.

The controller 36 reads the temperatures of the thin battery cells 12A, 12B, 12C and 12D output from the temperature detecting units 32A, 32B, 32C and 32D. Controller 36 then prepares commands on the basis of the temperatures of the thin battery cells and sends them to the discharging circuits 34A, 34B, 34C and 34D to thereby control the switches of the discharging circuits.

Figure 6:
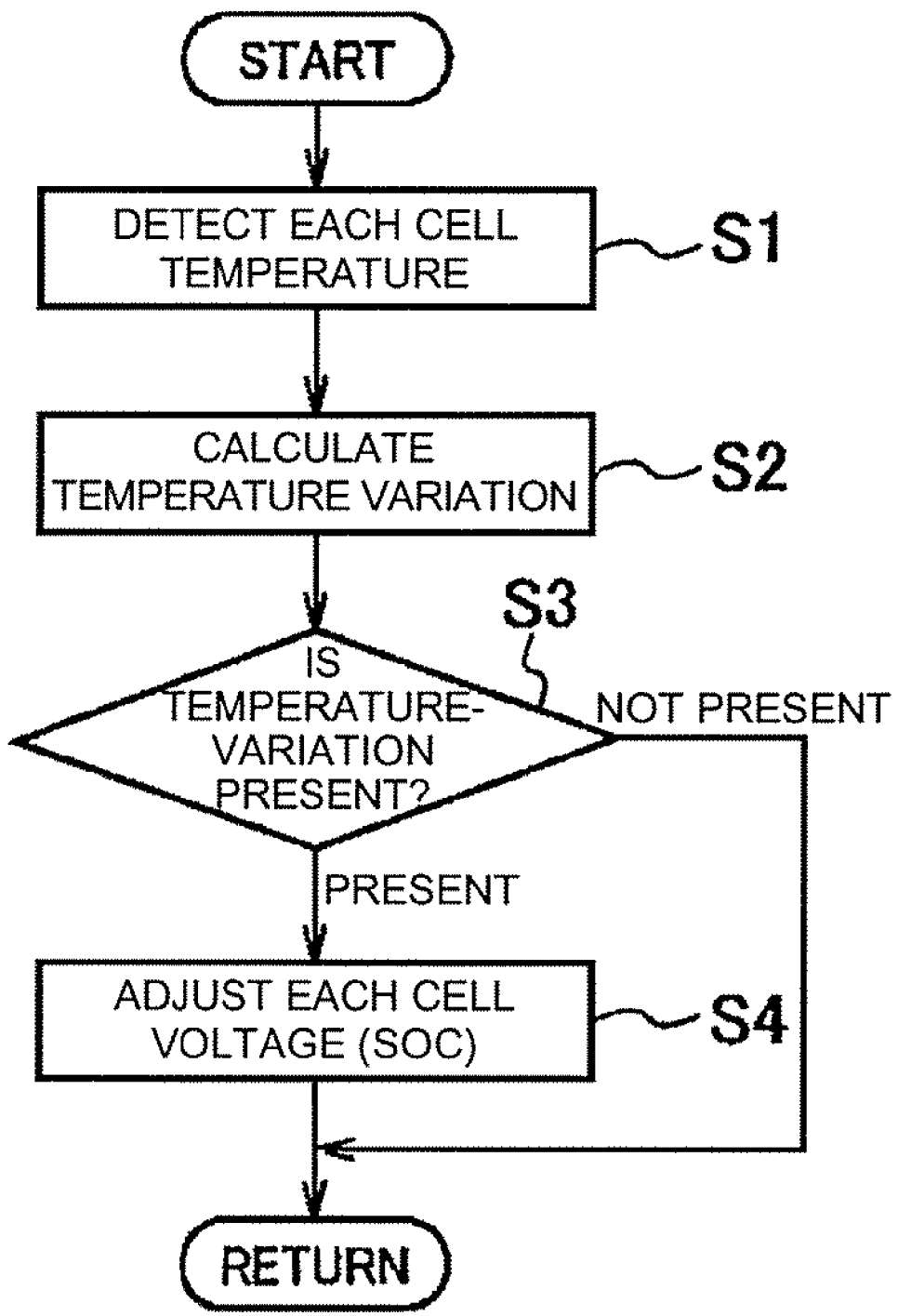
FIG. 6 is a flowchart showing procedural steps of a process for controlling states of charge of thin battery cells.

Operations of the controller 36 will be described by using a flow chart of FIG. 6. The process flow chart starts at the same time as the controller 36 is supplied with electric power from a power source (not shown) to power-up the controller 36.

In the embodiment description to follow, it is assumed that the thin battery cells 12A, 12B, 12C, 12D have been charged to uniform states of charge (for example, 85%) when the controller 36 is started.

In step S1, the controller reads temperatures of the thin battery cells 12A, 12B, 12C and 12D output from the temperature detecting units 32A, 32B, 32C and 32D.

In the next step S2, the controller 36 computes the maximum and the minimum temperatures of those detected from all the thin battery cells 12A, 12B, 12C, 12D. In step S3, the controller 36 calculates a difference between the maximum and minimum temperatures to check whether or not a variation is present among those temperatures. If the difference between the maximum and minimum temperatures is a predetermined value or higher, the controller 36 determines that a variation is present. If it is lower than the predetermined value, the controller 36 determines that no variation is present. If no variation is present, the controller 36 ends the process. If a variation is present, the controller 36 advances to step S4.

In the next step S4, the controller 36 calculates the temperature difference between each thin battery cell 12A, 12B, 12C, 12D and the minimum temperature. The controller 36 sends timing signals based on the calculated temperature differences to the discharging circuits 34A, 34B, 34C and 34D and turns on the switches to discharge the electric power of the thin battery cells 12A, 12B, 12C and ID. For example, the timing signals of the switches are adjusted to lower the state of charge by 1% or to decrease the temperature by 1° C. relative to the minimum temperature. This is equivalent to an open-circuit voltage reduction of 10 mV with respect to 1° C. of the temperature difference relative to the minimum temperature. For example, in a case where a thin battery cell has a temperature that is 110° C. higher than the minimum temperature, the state of charge of the thin battery cell is reduced to 10% (0.1 V of the open-circuit voltage) below the state of charge of the thin battery cell(s) having the minimum temperature.

In this case, as described above, it is preferable that the difference between the state of charge of the thin battery cells with the highest state of charge and that of the thin battery cells with the lowest state of charge is limited to be within 10%. Alternatively, it is preferable that the difference between the open-circuit voltage of the thin battery cell having the lowest open-circuit voltage and that of the thin battery cells having the highest open-circuit voltage is limited to be within 0.1 V.

For the thin battery cell with high temperature and a large increasing rate of internal-resistance, the SOC of that thin battery cell is reduced. Therefore, the increasing rate of internal-resistance owing to the SOC is made small, whereby the rates of deterioration of the thin battery cells 12A, 12B, 12C and 12D are close to equal value. Accordingly, in the battery pack, the thin battery cells 12A, 12B, 12C and 12D are adjusted to deteriorate at similar rates as much as possible. The service lives of the thin battery cells 12A, 12B, 12C and 12D forming the battery pack 10 are substantially equalized. Therefore, there is no need to disassemble the battery and replace only the thin battery cell that has deteriorated more than the others with a new one. This leads to a reduction of battery management cost.

It should be understood that the present invention is not limited to the embodiments mentioned above, but may be variously modified, altered and changed within true spirits of the invention.

A stack of thin battery cells 12A, 12B, 12C, 12D (unit cells) is used for the battery pack 10 in the embodiments mentioned above. In a case where the battery pack of the invention is used as a high-power battery pack 10, such as a power source for a motor, or as a driving power source of a vehicle, unit battery packs composed of a plurality of thin battery cells are formed, and those unit batteries are layered together to form a battery pack. Also in this case, temperatures of some unit battery packs rise high and temperatures of some unit battery packs do not rise high. Accordingly, the service lives of those unit battery packs may be equalized by controlling the states of charge or the open-circuit voltages in the manner as described above. Specifically, the states of charge or the open-circuit voltages of the high-temperature unit batteries are set to be lower than those of the low-temperature unit battery packs, whereby the state of charge or the open-circuit voltage is controlled for each unit battery pack to equalize the service lives of the unit battery packs.

The battery pack 10 containing a stack of four thin battery cells 12A, 12B, 12C, 12D has been described in the embodiments. However, the number of thin battery cells 12A, 12B, 12C, 12D is not limited to four, but may be six or eight since the invention involves the technical idea that as the temperature increases, the SOC or the open-circuit voltage decreases. Also, various embodiments described herein refer to "thin" battery cells 12A, 12B, 12C, 12D; however, the invention is not necessarily limited to cells that are thin.

What is claimed is:

1. A battery system, comprising:
    a battery pack having a plurality of electrically connected unit cells including a first unit cell and a second unit cell that are substantially identical to one another and are electrically connected to one another, wherein the battery pack is configured such that the second unit cell dissipates heat more readily than the first unit cell;
    a temperature detecting unit which detects a temperature of each of the first and second unit cells; and
    a charge control unit configured to charge the first unit cell to a state of charge or open cell voltage determined according to the temperature of the first unit cell and to charge the second unit cell to a state of charge or open cell voltage determined according to the temperature of the second unit cell, such that the first unit cell is charged to a state of charge or open cell voltage that is less than that of the second unit cell and such that the first unit cell and the second unit cell degrade at a similar rate.

2. The battery pack according to claim 1, wherein the unit cells are thin battery cells stacked in a thickness direction of the thin battery cells, and the first unit cell is located on an inner side of the second unit cell as viewed in a stacked direction.

3. The battery pack according to claim 2, wherein a difference between a state of charge of a unit cell having the highest state of charge among the plurality of unit cells and a state of charge of a unit cell having the lowest state of charge is 10% or less.

4. The battery pack according to claim 2, wherein a difference between an open circuit voltage of a unit cell having the highest open circuit voltage among the plurality of unit cells and an open circuit voltage of a unit cell having the lowest open voltage is 0.1 V or less.

5. A method of manufacturing a battery system, comprising:
    electrically connecting a first unit cell and a second unit cell in series to form a battery pack, wherein the first unit cell and the second unit cell are substantially identical to one another;
    stacking the first unit cell and the second unit cell within the battery pack such that the position of first and second unit cells within the battery pack causes the second unit cell to dissipate heat more readily than the first unit cell;
    charging the first unit cell to a first condition selected from a group consisting of a state of charge and an open circuit voltage, the first condition based on a temperature of the first unit cell; and
    charging the second unit cell to a second condition selected from a group consisting of a state of charge and open circuit voltage, the second condition based on the temperature of the second unit cell, and the second condition being higher than the first condition such that the first unit cell and the second unit cell degrade at a similar rate.

6. A method of controlling a battery system, comprising:
    providing a battery back having a first unit cell and a second unit cell that are substantially identical to one another and electrically connected to one another, the battery pack configured such that the second unit cell dissipates heat more readily than the first unit cell;
    detecting a temperature of each of the first unit cell and the second unit cell; and
    controlling charging of the first and second unit cells according to the detected temperatures of the first and second unit cells such that a condition selected from a group consisting of states of charge and open circuit voltages is less for the first unit cell than a corresponding condition for the second unit cell, where the temperature of the second unit cell is lower than temperatures the temperature of the first unit cell and the first unit cell and the second unit cell degrade at a similar rate.

7. A battery system, comprising:
    a first unit cell and a second unit cell electrically interconnected to form a battery wherein the battery is configured so that the second unit cell dissipates heat more readily than the first unit cell;
    temperature detecting means for detecting a temperature of each of the first unit cell and the second unit cell; and
    a state-of-charge control means for controlling charging of the first unit cell and the second unit cell according to the temperatures of the first and second unit cells detected by the temperature detecting means such that a condition selected from the group consisting of states of charge and open circuit voltages of the first unit cell is less than a corresponding condition of the second unit cell such that the first unit cell and the second unit cell degrade at a similar rate, the second unit cell having temperatures lower than those of the first unit cell.

* * * * *